United States Patent
Darji et al.

(10) Patent No.: US 11,020,721 B2
(45) Date of Patent: *Jun. 1, 2021

(54) METHOD OF FORMING POROUS METAL OXIDE MICROSPHERES

(71) Applicants: President and Fellows of Harvard College, Cambridge, MA (US); BASF SE, Ludwigshafen (DE)

(72) Inventors: Rupa Hiremath Darji, New York, NY (US); James Newhouse, New York, NY (US); Vinothan N. Manoharan, Cambridge, MA (US); Victoria Hwang, Cambridge, MA (US); Anna B. Stephenson, Somerville, MA (US)

(73) Assignees: BASF SE, Ludwigshafen am Rhein (DE); PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 136 days.

This patent is subject to a terminal disclaimer.

(21) Appl. No.: 16/126,338

(22) Filed: Sep. 10, 2018

(65) Prior Publication Data

US 2019/0076809 A1 Mar. 14, 2019

Related U.S. Application Data

(60) Provisional application No. 62/556,792, filed on Sep. 11, 2017.

(51) Int. Cl.
| | | |
|---|---|---|
| *B01J 13/00* | (2006.01) | |
| *B01J 13/04* | (2006.01) | |
| *C01B 33/12* | (2006.01) | |
| *C01G 23/08* | (2006.01) | |
| *C01G 9/03* | (2006.01) | |
| *C01G 1/02* | (2006.01) | |
| *C01G 9/02* | (2006.01) | |
| *C01B 13/14* | (2006.01) | |

(52) U.S. Cl.
CPC ............ *B01J 13/043* (2013.01); *C01B 13/14* (2013.01); *C01B 13/145* (2013.01); *C01B 33/12* (2013.01); *C01G 1/02* (2013.01); *C01G 9/02* (2013.01); *C01G 9/03* (2013.01); *C01G 23/08* (2013.01); *C01P 2004/03* (2013.01); *C01P 2004/32* (2013.01); *C01P 2004/61* (2013.01); *C01P 2004/62* (2013.01); *C01P 2006/16* (2013.01)

(58) Field of Classification Search
CPC ........ B01J 13/043; C01B 13/14; C01B 33/12; C01F 17/00; C01F 17/10; C01F 7/02; C01F 7/021; C01F 7/027; C01G 1/02; C01G 9/02; C01G 15/00; C01G 19/02; C01G 23/04–0538; C01G 23/08; C01G 37/02–033; C01G 25/02; C01G 49/02–08; C01P 2004/32; C01P 2004/61; C01P 2004/62; C01P 2006/16

See application file for complete search history.

(56) References Cited

U.S. PATENT DOCUMENTS

| | | |
|---|---|---|
| 5,266,099 A | 11/1993 | Kelley |
| 5,384,290 A | 1/1995 | Brezny |
| 5,492,870 A | 2/1996 | Wilcox |
| 6,004,525 A | 12/1999 | Tani |
| 6,221,326 B1 | 4/2001 | Amiche |
| 6,894,086 B2 | 5/2005 | Munro et al. |
| 9,150,422 B2 | 10/2015 | Nakayama et al. |
| 9,358,533 B2 | 6/2016 | Tran et al. |
| 9,556,023 B2 | 1/2017 | Sato et al. |
| 2006/0025301 A1 | 2/2006 | Reddy et al. |
| 2006/0252649 A1 | 11/2006 | Pluta et al. |
| 2007/0231884 A1 | 10/2007 | Kitagawa et al. |
| 2009/0038512 A1 | 2/2009 | Xu et al. |
| 2010/0000443 A1 | 1/2010 | Kawai et al. |
| 2010/0069237 A1 | 3/2010 | Yano et al. |
| 2010/0112350 A1 | 5/2010 | Tanimizu et al. |
| 2010/0247663 A1* | 9/2010 | Day .................. A61P 17/02 424/497 |
| 2010/0247914 A1 | 9/2010 | Enomoto et al. |
| 2010/0264097 A1* | 10/2010 | Sun .................. B01J 35/1076 210/767 |

(Continued)

FOREIGN PATENT DOCUMENTS

| | | |
|---|---|---|
| CN | 101559951 | 10/2009 |
| CN | 103041872 | 4/2013 |

(Continued)

OTHER PUBLICATIONS

Iwata, et al., "Bio-Inspired Bright Structurally Colored Colloidal Amorphous Array Enhanced by Controlling Thickness and Black Background," Advanced Science News, 2017, 8 pgs., Wiley-VCH.

(Continued)

*Primary Examiner* — Steven J Bos

(74) *Attorney, Agent, or Firm* — Lowenstein Sandler LLP

(57) ABSTRACT

Porous metal oxide microspheres are prepared via a process comprising forming a liquid dispersion of polymer nanoparticles and a metal oxide; forming liquid droplets of the dispersion; drying the droplets to provide polymer template microspheres comprising polymer nanospheres; and removing the polymer nanospheres from the template microspheres to provide the porous metal oxide microspheres. The porous microspheres exhibit saturated colors and are suitable as colorants for a variety of end-uses.

16 Claims, 4 Drawing Sheets

(56) References Cited

U.S. PATENT DOCUMENTS

| | | | | |
|---|---|---|---|---|
| 2011/0129941 | A1* | 6/2011 | Kumacheva | B01F 5/0647 436/180 |
| 2011/0250453 | A1 | 10/2011 | Leyrer et al. | |
| 2012/0107611 | A1 | 5/2012 | Yang et al. | |
| 2012/0282316 | A1 | 11/2012 | Brick | |
| 2014/0017145 | A1* | 1/2014 | Aizenberg | C08G 59/502 422/425 |
| 2014/0178262 | A1 | 6/2014 | Tran et al. | |
| 2014/0254017 | A1 | 9/2014 | Manoharan et al. | |
| 2016/0089334 | A1 | 3/2016 | Nakayama et al. | |
| 2016/0144350 | A1 | 5/2016 | Aizenberg et al. | |
| 2016/0168386 | A1 | 6/2016 | Aizenberg et al. | |
| 2016/0170091 | A1 | 6/2016 | Li et al. | |
| 2016/0311132 | A1 | 10/2016 | Yan et al. | |
| 2017/0096360 | A1 | 4/2017 | Hojaji et al. | |
| 2017/0106113 | A1 | 4/2017 | Meinhart et al. | |
| 2017/0190867 | A1 | 7/2017 | Marchin | |
| 2019/0076809 | A1 | 3/2019 | Darji et al. | |
| 2019/0076810 | A1 | 3/2019 | Darji et al. | |
| 2019/0111657 | A1 | 4/2019 | Aizenberg et al. | |

FOREIGN PATENT DOCUMENTS

| | | |
|---|---|---|
| CN | 103359782 | 10/2013 |
| CN | 108893777 | 11/2018 |
| CN | 109989049 | 7/2019 |
| JP | S5424931 | 2/1979 |
| JP | S58223606 | 12/1983 |
| JP | H05138009 | 6/1993 |
| JP | H06142491 | 5/1994 |
| JP | H0796165 | 4/1995 |
| JP | 2001342010 | 12/2001 |
| JP | 2004277249 | 10/2004 |
| JP | 2007152178 | 6/2007 |
| JP | 2010106579 | 5/2010 |
| JP | 2011016718 | 1/2011 |
| JP | 2012240864 | 12/2012 |
| JP | 2015155373 | 8/2015 |
| JP | 2017125252 | 7/2017 |
| JP | 2017193462 | 10/2017 |
| JP | 2019043825 | 3/2019 |
| WO | 2010115919 | 10/2010 |

OTHER PUBLICATIONS

El Kadib, et al., "Chitosan templated synthesis of porous metal oxide microspheres with filamentary nanostructures," Microporous and Microporous Materials, 2011, vol. 142, Issue 1, Elsevier, Abstract.
Kim, et al., "Microwave-Assisted Self-Organization of Colloidal Particles in Confining Aqueous Droplets," J. Am. Chem. Soc., 2006, vol. 128, No. 33, pp. 10897-10904.
International Search Report and Written Opinion for Application No. PCT/US18/50168 dated Nov. 20, 2018, 10 pages.
International Search Report and Written Opinion for Application No. PCT/US18/50175 dated Nov. 19, 2018, 12 pages.
Guo, Z. et al, "High-Quality Hollow Closed-Pore Silica Antireflection Coatings Based on Styrene-Acrylate Emulsion @ Organic-Inorganic Silica Precursor", ACS Appl. Mater. Interfaces, Jan. 1, 2016, pp. 11796-11805, vol. 8, Issue 18, University of Chinese Academy of Sciences, Beijing, China, 10 pages.
Sun, Z. et al. "Porous silica ceramics with closed-cell structure prepared by inactive hollow spheres for heat insulation", J Alloys Compd, Year: 2016, vol. 662, pp. 157-164, China University of Chinese Academy of Sciences, Beijing, China, 8 pages.
Huang, L. et al, "Versatile surfactant/swelling-agent template for synthesis of large-pore ordered mesoporous silicas and related hollow nanoparticles", Chem. Mater., Year: 2015, vol. 27, Issue 3, pp. 679-689, New York, NY, 11 pages.
Zhnag X. et al, "Multifunctional Antireflection Coatings Based on Novel Hollow Silica-Silica Nanocomposites", ACS Appl. Mater. Interfaces, Year 2014; vol. 6; Issue 3; pp. 1415-1423, China University of Chinese Academy of Sciences, Ningbo, China, 9 pages.
Velev, O.D. et al, "Colloidal crystals as templates for porous materials", Curr. Opin. Colloid Interface Sci.; Year: 2000; vol. 5; Issue: 1-2; pp. 56-63; Center for Molecular and Engineering Thermodynamics, Department of Chemical Engineering, University of Delaware, Newark, DE, United States, 8 pages.
Lukens Jr., W.W., et al, "Synthesis of mesocellular silica foams with tunable window and cell dimensions", Chem. Mater.; Year: 2001; vol. 13; Issue: 1; pp. 28-34; University of California, Santa Barbara, CA, 7 pages.
Cho, Y. "Fabrication of porous titania particles from complex fluids by spray drying process and their applications" J. Korean Inst. Met. Mat.; Year: 2017; vol. 55; Issue: 4; pp. 264-273; Department of Chemical Engineering and Biotechnology, Korea Polytechnic University, Siheung, South Korea, 10 pages.
Fan, X et al., "Large-scale preparation of macro-porous silica microspheres: Via sol-gel composite particles and a spray drying process", RSC Adv.; Year: 2017; vol. 7; Issue: 88; pp. 56081-56086; Department of Chemistry and Chemical Engineering, Taiyuan Institute of Technology, Taiyuan, China, 6 pages.
Cho Y. et al, "Fabrication of Porous Titania Particles from Water-in-Oil Emulsions for the Applications of Photocatalyst", J. Dispersion Sci. Technol.; Year: 2016; vol. 37; Issue: 5; pp. 676-686; Department of Chemical Engineering and Biotechnology, Korea Polytechnic University, Gyeonggi-do, South Korea, 12 pages.
Zokhov, A.A. et al, "Photonic crystal microspheres", Opt Mater; Year: 2015; vol. 49; pp. 208-212; Institute of Solid State Physics, RAS, Chernogolovka, Moscow District, Russian Federation, 5 pages.
Velev, O.D. et al, "Structured porous materials via colloidal crystal templating: from inorganic oxides to metals", Adv Mater; Year: 2000; vol. 12; Issue: 7; pp. 531-534; Ctr. for Molec. and Eng. Thermodyn., Department of Chemical Engineering, University of Delaware, Newark, DE, United States, 4 pages.
Cho. Y. et al, "Bulk synthesis of ordered macroporous silica particles for superhydrophobic coatings", J. Colloid Interface Sci.; Year: 2012; vol. 386; Issue: 1; pp. 88-98; Powders and Ceramics Division, Korea Institute of Materials Science, Sangnam-dong, Changwon, South Korea, 11 pages.
Barros, Filho et al, "Morphology and topography analysis of mesoporous titania templated by micrometric latex sphere arrays", Microporous Mesoporous Mater.; Year: 2012; vol. 152; pp. 84-95; Anhanguera Bandeirante University, School of Dentistry, Maria Candida, Bloco G, São Paulo, SP, Brazil, 12 pages.
Du, X et al, "Spherical silica micro/nanomaterials with hierarchical structures: Synthesis and applications", Nanoscale; Year: 2011; vol. 3; Issue: 10; pp. 3984-4002; Key Laboratory of Photochemical Conversion and Optoelectronic Materials, Technical Institute of Physics and Chemistry (TIPC), Chinese Academy of Sciences, Zhongguancundonglu 29, Haidianqu, Beijing, China, 19 pages.
Lee, S.Y., et al, "Morphology and Particle Size Distribution Controls of Droplet-to-Macroporous/Hollow Particles Formation in Spray Drying Process of Colloidal Mixtures Precursor", Aerosol Sci. Technol.; Year: 2009; vol. 43; Issue: 12; pp. 1184-1191; Department of Chemical Engineering, Graduate School of Engineering, Higashi-Hiroshima, Japan, 9 pages.
Stein, A., "Sphere templating methods for periodic porous solids", Microporous Mesoporous Mater.; Year: 2001; vol. 44-45; pp. 227-239; Department of Chemistry, University of Minnesota, Minneapolis, MN, United States, 13 pages.
Zhao, D. et al, "Topological construction of mesoporous materials", Curr. Opin. Solid State Mater. Sci.; Year: 1998; vol. 3; Issue: 1; pp. 111-121; Departments of Chemistry, Chem. Eng., Mat., Univ. C., Santa Barbara, CA, United States, 11 pages.
Li, H. et al, "Ordered macroporous titania photonic balls by micrometer-scale spherical assembly templating", J. Mater. Chem.; Year: 2005; vol. 15; Issue: 26; pp. 2551-2556; Key Laboratory of Nanomaterials, Beijing University of Chemical Technology, Ministry of Education, Beijing 100029, China, 6 pages.
Le, Y. et al, "A novel pathway for synthesis of silica hollow spheres with mesostructured walls", Mater Lett; Year: 2004; vol. 58; Issue:

(56) References Cited

OTHER PUBLICATIONS

15; pp. 2105-2108; Research Center, Min. Educ. High Gravity Eng./T., Beijing Uni. of Chemical Technology, Beijing 100029, China, 4 pages.

Zhang, G. et al, "Silica nanobottles templated from functional polymer spheres", J. Colloid Interface Sci.; Year: 2003; vol. 263; Issue: 2; pp. 467-472; Key Lab. Supramolecular Struct./Mat., Department of Chemistry, Jilin Jniversity, Changchun 130023, China, 6 pages.

Chevalier, P.M. et al, "Nanoporous silica particles prepared by chemical reactivity of ORMOSILs", D J. Mater. Chem.; Year: 2002; vol. 12; Issue: 10; pp. 3003-3009; Dow Coming Ltd., Cardiff Road, Barry, South Glamorgan, CF63 2 YL, United Kingdom, 7 pages.

Fan, H. et al, "Multiphased assembly of nanoporous silica particles", J Non Cryst Solids; Year: 2001; vol. 285; Issue: 1-3; pp. 71-78; Department of Chem. and Nuclear Eng., Center for Micro-Engineered Materials, University of New Mexico/NSF, Albuquerque, NM, 8 pages.

Caruso, F. et al, "Hollow Titania Spheres from Layered Precursor Deposition on Sacrificial Colloidal Core Particles", Adv Mater; Year: 2001; vol. 13; Issue: 10; pp. 740-744; Max Planck Institute of Colloids and nterfaces, D-14424 Potsdam, Germany, 5 pages.

Iskandar, F. et al, "In Situ Production of Spherical Silica Particles Containing Self-Organized Mesopores", Nano Lett.; Year: 2001; vol. 1; Issue: 5; pp. 231-234; epartment of Chemical Engineering, Hiroshima University, 1-4-1 Kagamiyama, Higashi Hiroshima 739-8527, Japan, 4 pages.

Toprakcioglu Z. et al, "Multi-scale microporous silica microcapsules from gas-in water-in oil emulsions", Soft Matter; Year: 2020; vol. 16; Issue: 12; pp. 3082-3087; Department of Chemistry, University of Cambridge, Lensfield Road, Cambridge, CB2 1EW, United Kingdom, 6 pages.

Wang, B. et al, "Macroporous materials: Microfluidic fabrication, functionalization and applications", Chem. Soc. Rev.; Year: 2017; vol. 46; Issue: 3; pp. 855-914; East China University of Science and Technology, Shanghai, 200237, China, 60 pages.

Liu, W. et al, "On the spray drying of uniform functional microparticles", Particuology; Year: 2015; vol. 22; pp. 1-12; Department of Chemical Engineering, Monash University, Australia, 12 pages.

Brugarolas T. et al, "Directed assembly of particles using microfluidic droplets and bubbles", Soft Matter; Year: 2013; vol. 9; Issue: 38; pp. 9046-9058; Department of Chemical and Biomolecular Engineering, University of Pennsylvania, Philadelphia PA 19104, United States, 13 pages.

Wang, J.T. et al, "Fabrication of advanced particles and particle-based materials assisted by droplet-based microfluidics", Small; Year: 2011; vol. 7; Issue: 13; pp. 1728-1754; School of Chemical Engineering and Technology, State Key Laboratory of Chemical Engineering, Tianjin University, Tianjin 300072, China, 27 pages.

Yi, G.R. et al, "Generation of uniform photonic balls by template-assisted colloidal crystallization", Synth Met; Year: 2003; vol. 139; Issue: 3; pp. 803-806; Department of Chemical Engineering, Korea Adv. Inst. of Sci./Technology, Daejeon 305-701, South Korea, 4 pages.

Xia, Y. et al, "Monodispersed Colloidal Spheres:Old Materials with New Applications", Adv Mater; Year: 2000; vol. 12; Issue: 10; pp. 693-713; Department of Chemistry, University of Washington, Seattle, WA, United States, 21 pages.

Ernawati, L. et al, "Tunable synthesis of mesoporous silica particles with unique radially oriented pore structures from tetramethyl orthosilicate via oil-water emulsion process", Langmuir; Year: 2017; vol. 33; Issue: 3; pp. 783-790; Department of Chemical Engineering, Hiroshima University, 1-4-1 Kagamiyama, Hiroshima 739-8527, Japan, 8 pages.

Wozniak, M. et al, "Formation of Highly Ordered Spherical Aggregates from Drying Microdroplets of Colloidal Suspension", Langmuir; Year: 2015; vol. 31; Issue: 28; pp. 7860-7868; Institute of Physics, Polish Academy of Sciences, Al. Lotników 32/46, Warsaw, 02-668, Poland, 9 pages.

Naldoni, A. et al, "Porous TiO2 microspheres with tunable properties for photocatalytic air purification", Ultrason. Sonochem.; Year: 2013; vol. 20; Issue: 1; pp. 445-451; CNR, Istituto di Scienze e Tecnologie Molecolari, Via Golgi 19, 20133 Milano, Italy, 7 pages.

Peterson, A.K. et al, "Aerosol synthesis of porous particles using simple salts as a pore template", Langmuir; Year: 2010; vol. 26; Issue: 11; pp. 8804-8809; Department of Chemistry, Indiana University, Bloomington, IN 47405, United States, 6 pages.

Cheow, W.S. et al, "Spray drying formulation of hollow spherical aggregates of silica nanoparticles by experimental design" Chem. Eng. Res. Des.; Year: 2010; vol. 88; Issue: 5-6; pp. 673-685; School of Chemical and Biomedical Engineering, Nanyang Technological University, Singapore 637459, Singapore, 13 pages.

Smitha S. et al, "Synthesis of mesoporous hydrophobic silica microspheres through a modified sol-emulsion-gel process", J Sol Gel Sci Technol; Year: 2008; vol. 48; Issue: 3; pp. 356-361; National Institute for Interdisciplinary Science and Technology, India, 6 pages.

Jokanovic, V. et al, "Designing of nanostructured hollow TiO 2 spheres obtained by ultrasonic spray pyrolysis", J. Colloid Interface Sci.; Year: 2004; vol. 278; Issue: 2; pp. 342-352; Inst. Tech. Sci. Serbian Acad. S., 35 Knez Mihajlova St., 11000 Serbia, Belgrade, Serbia, 11 pages.

Fowler, C.E. et al, "Interfacial synthesis of hollow microspheres of mesostructured silica", Chem. Commun.; Year: 2001; vol. 1; Issue: 19; pp. 2028-2029; School of Chemistry, Univeristy of Bristol, BS8 1TS, United Kingdom, 2 pages.

Li, B. et al, "Ultrasonic-spray-assisted synthesis of metal oxide hollow/mesoporous microspheres for catalytic CO oxidation", RSC Adv.; Year: 2015; vol. 5; Issue: 104; pp. 85640-85645; College of Materials Science and Engineering, Anhui University of Science and Technology, Huainan, Anhui, 232001, China, 6 pages.

Fischer, M.G. et al, "Mesoporous Titania Microspheres with Highly Tunable Pores as an Anode Material for Lithium Ion Batteries", ACS Appl. Mater. Interfaces; Year: 2017; vol. 9; Issue: 27; pp. 22388-22397; Adolphe Merkle Institute, Université de Fribourg, Chemin des Verdiers 4, Fribourg, 1700, Switzerland, 10 pages.

Nandiyanto, A.B.D. et al, "Template-assisted spray-drying method for the fabrication of porous particles with tunable structures", Adv Powder Technol; Year: 2019; vol. 30; Issue: 12; pp. 2908-2924; Department of Mechanical and Nuclear Engineering, Richmond, VA, 17 pages.

Debecker, D.P. et al, "Aerosol processing: A wind of innovation in the field of advanced heterogeneous catalysts", Chem. Soc. Rev.; Year: 2018; vol. 47; Issue: 11; pp. 4112-4155; Université Catholique de Louvain, Institute of Condensed Matter and Nanosciences, Louvain-La-Neuve, Belgium, 44 pages.

Yang, X.Y. et al, "Hierarchically porous materials: Synthesis strategies and structure design", Chem. Soc. Rev.; Year: 2017; vol. 46; Issue: 2; pp. 481-558; State Key Laboratory Advanced Technology for Materials Synthesis and Processing, School of Materials Science and Engineering, Wuhan University of Technology, Wuhan, China, 78 pages.

Okuyama, K et al, "Preparation of functional nanostructured particles by spray drying", Adv Powder Technol; Year: 2006; vol. 17; Issue: 6; pp. 587-611; Department of Chemical Engineering, Graduate School of Engineering, Hiroshima University, Higashi-Hiroshima, Japan, 25 pages.

Phillips, K.R. et al, "A colloidoscope of colloid-based porous materials and their uses", Chem. Soc. Rev.; Year: 2016; vol. 45; Issue: 2; pp. 281-322; Department of Chemistry and Chemical Biology, Harvard University, Cambridge, United States, 43 pages.

Armstrong, E. et al, "Artificial opal photonic crystals and inverse opal structures—fundamentals and applications from optics to energy storage", J. Mater. Chem. C; Year: 2015; vol. 3; Issue: 24; pp. 6109-6143; Department of Chemistry, University College Cork, Cork, Ireland, 35 pages.

Boissiere, C. et al, "Aerosol Route to Functional Nanostructured Inorganic and Hybrid Porous Materials", Adv Mater; Year: 2011; vol. 23; Issue: 5; pp. 599-623; UPMC Univ. Paris 06, CNRS, College de France, Paris, France, 25 pages.

Chang, H. et al, "Controlled synthesis of porous particles via aerosol processing and their applications", Adv Powder Technol; Year:

(56) References Cited

OTHER PUBLICATIONS

2014; vol. 25; Issue: 1; pp. 32-42; Rare Metals Research Center, Korea Institute of Geoscience and Mineral Resources, Daejeon 305-350, South Korea, 11 pages.
Stein, A. et al, "Design and functionality of colloidal-crystal-templated materials—Chemical applications of inverse opals", Chem. Soc. Rev.; Year: 2013; vol. 42; Issue: 7; pp. 2763-2803; Department of Chemistry, University of Minnesota, 207 Pleasant St. SE, Minneapolis MN 55455, United States, 41 pages.
Fan, J.B. et al, "Nanoporous microspheres: From controllable synthesis to healthcare applications", J. Mater. Chem. 8; Year: 2013; vol. 1; Issue: 17; pp. 2222-2235; Chinese Academy of Sciences, Beijing, China, 14 pages.
Motl, N.E. et al, "Aerosol-assisted synthesis and assembly of nanoscale building blocks", J. Mater. Chem. A; Year: 2013; vol. 1; Issue: 17; pp. 5193-5202; Department of Chemistry, University Indiana—Bloomington, Bloomington, IN, United States, 8 pages.
Han, C. et al, "Characterization and investigation on the difference of hydrothermal stability for ordered mesoporous aluminosilicate sieves", Adv Powder Technol; Year: 2011; vol. 22; Issue: 1; pp. 20-25; College of Environmental Science and Engineering, Kunming, China, 6 pages.

\* cited by examiner

METHOD OF FORMING POROUS METAL OXIDE MICROSPHERES

Disclosed are porous metal oxide microspheres, methods of their preparation and uses thereof. The microspheres are suitable for example for use as structural colorants.

BACKGROUND

Traditional pigments and dyes exhibit color via light absorption and reflection, relying on chemical structure. Structural colorants exhibit color via light interference effects, relying on physical structure as opposed to chemical structure. Structural colorants are found in nature, for instance in bird feathers, butterfly wings and certain gemstones. Structural colorants are materials containing microscopically structured surfaces small enough to interfere with visible light and produce color. Such materials may be based on photonic materials including, but not limited to, opals, inverse opals, photonic granules, photonic spheres or composite photonic crystals. The term "photonic material" refers to a material having a degree of periodic variations in its structure.

Structural colorants may exhibit high stability. Accordingly, desired are structural colorants that exhibit different colors of visible light observable to the naked eye when present in bulk. Such structural colorants may be formulated into consumer products as a replacement for less stable and/or less environmentally friendly pigments or dyes.

It has been found that certain porous metal oxide microspheres exhibit high quality color in bulk. The microspheres provide color visible in the bulk.

SUMMARY

Accordingly, disclosed is a method to prepare porous metal oxide microspheres comprising a metal oxide, the method comprising forming a liquid dispersion of polymer nanoparticles and a metal oxide; forming liquid droplets of the dispersion; drying the liquid droplets to provide polymer template microspheres comprising polymer nanospheres and metal oxide; and removing the polymer nanospheres from the template microspheres to provide the porous metal oxide microspheres.

Also disclosed are porous microspheres comprising a metal oxide, wherein the microspheres have an average diameter of from about 0.5 µm to about 100 µm, an average porosity of from about 0.10 to about 0.90 or from about 0.10 to about 0.80 and an average pore diameter of from about 50 nm to about 999 nm.

Also disclosed are porous microspheres comprising a metal oxide, wherein a bulk sample of the porous microspheres exhibits color observable by the human eye.

Disclosed also are compositions comprising a substrate and the present porous microspheres; for example where the compositions are aqueous formulations, oil-based formulations, coatings formulations, foods, inks, plastics, cosmetic formulations or materials for medical applications or security applications.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DESCRIPTION

Present metal oxide microspheres, or photonic balls, may be prepared with the use of a polymeric sacrificial template. In one embodiment, an aqueous colloid dispersion containing polymer particles and a metal oxide is prepared, the polymer particles typically being nano-scaled. The aqueous colloidal dispersion is mixed with a continuous oil phase, for instance within a microfluidic device, to produce a water-in-oil emulsion. Emulsion aqueous droplets are prepared, collected and dried to form microspheres containing polymer nanoparticles and metal oxide. The polymer nanoparticles (nanospheres) are then removed, for instance via calcination, to provide spherical, micron-scaled metal oxide particles (microspheres) containing a high degree of porosity and nano-scaled pores. The microspheres may contain uniform pore diameters, a result of the polymer particles being spherical and monodisperse.

Figure 1:
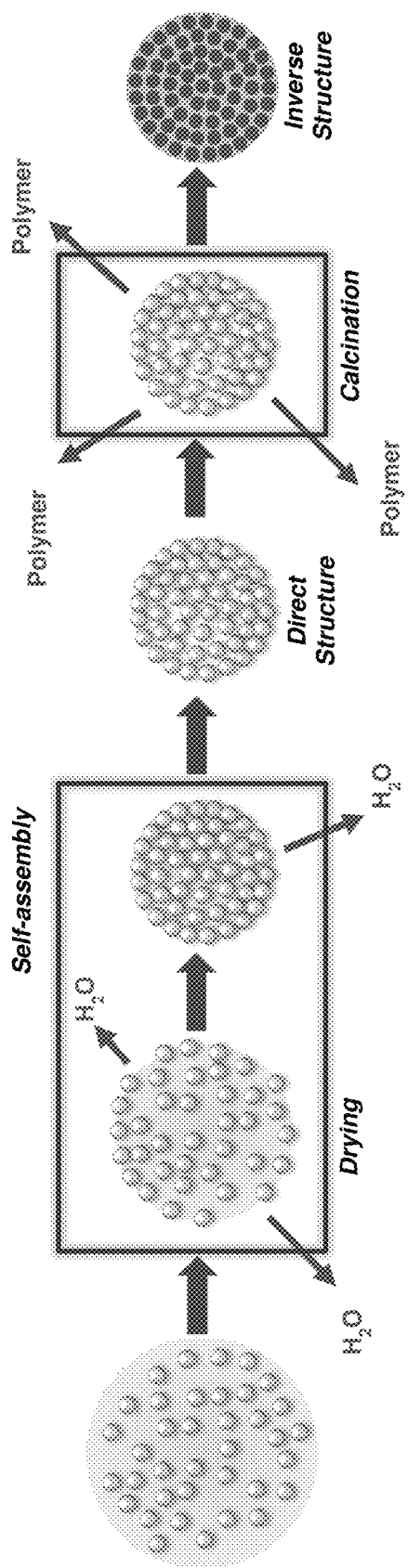
FIG. 1 shows a general outline for the preparation of porous microspheres according to an embodiment of the invention.

FIG. 1 shows a general outline for the preparation of present porous microspheres. An emulsion droplet containing polymer nanospheres and metal oxide is dried to remove solvent, providing an assembled microsphere containing polymer nanospheres with metal oxide in the interstitial spaces between the polymer nanospheres (template microsphere or "direct structure"). The polymer nanospheres define the interstitial space. Calcination results in removal of the polymer, providing a present metal oxide microsphere with high porosity, or void volume (inverse structure).

The porous metal oxide microspheres are advantageously sintered, resulting in a continuous solid structure which is thermally and mechanically stable.

In some embodiments, droplet formation and collection occurs within a microfluidic device. Microfluidic devices are for instance narrow channel devices having a micron-scaled droplet junction adapted to produce uniform size droplets connected to a collection reservoir. Microfluidic devices for example contain a droplet junction having a channel width of from about 10 µm to about 100 µm. The devices are for instance made of polydimethylsiloxane (PDMS) and may be prepared for example via soft lithography. An emulsion may be prepared within the device via pumping an aqueous dispersed phase and oil continuous phase at specified rates to the device where mixing occurs to provide emulsion droplets. Alternatively, an oil-in-water emulsion may be employed.

In some embodiments, vibrating nozzle techniques may be employed. In these techniques, a liquid dispersion is prepared, droplets are formed and are dropped into a bath of a continuous phase. The droplets are then dried followed by removal of the polymer. Vibrating nozzle equipment is available from Büchi and comprises for instance a syringe pump and a pulsation unit. Vibrating nozzle equipment may also comprise a pressure regulation valve.

The polymer nanoparticles for instance have an average diameter of from about 50 nm to about 999 nm and are monodisperse.

Suitable template polymers include thermoplastic polymers. For example, template polymers are selected from the group consisting of poly(meth)acrylic acid, poly(meth)acrylates, polystyrenes, polyacrylamides, polyvinyl alcohol, polyvinyl acetate, polyesters, polyurethanes, polyethylene, polypropylene, polylactic acid, polyacrylonitrile, polyvinyl ethers, derivatives thereof, salts thereof, copolymers thereof and combinations thereof. For example, the polymer is selected from the group consisting of polymethyl methacrylate, polyethyl methacrylate, poly(n-butyl methacrylate), polystyrene, poly(chloro-styrene), poly(alpha-methylstyrene), poly(N-methylolacrylamide), styrene/methyl methacrylate copolymer, polyalkylated acrylate, polyhydroxyl acrylate, polyamino acrylate, polycyanoacrylate, polyfluorinated acrylate, poly(N-methylolacrylamide), polyacrylic acid, polymethacrylic acid, methyl methacrylate/ethyl acrylate/acrylic acid copolymer, styrene/methyl methacrylate/acrylic acid copolymer, polyvinyl acetate, polyvinylpyrrolidone, polyvinylcaprolactone, polyvinylcaprolactam, derivatives thereof, salts thereof, and combinations thereof.

In certain embodiments, polymer templates include polystyrenes, including polystyrene and polystyrene copolymers. Polystyrene copolymers include copolymers with water-soluble monomers, for example polystyrene/acrylic acid, polystyrene/poly(ethylene glycol) methacrylate, and polystyrene/styrene sulfonate.

Present metal oxides include oxides of transition metals, metalloids and rare earths, for example silica, titania, alumina, zirconia, ceria, iron oxides, zinc oxide, indium oxide, tin oxide, chromium oxide, mixed metal oxides, combinations thereof, and the like.

The wt/wt (weight/weight) ratio of polymer nanoparticles to metal oxide is for instance from about 0.1/1 to about 10.0/1 or from about 0.5/1 to about 10.0/1.

The continuous oil phase comprises for example an organic solvent, a silicone oil or a fluorinated oil. According to the invention "oil" means an organic phase immiscible with water. Organic solvents include hydrocarbons, for example, heptane, hexane, toluene, xylene, and the like, as well as alkanols such as methanol, ethanol, propanol, etc.

The emulsion droplets are collected, dried and the polymer is removed. Drying is performed for instance via microwave irradiation, in a thermal oven, under vacuum, in the presence of a desiccant or a combination thereof.

Polymer removal may be performed for example via calcination, pyrolysis or with a solvent (solvent removal). Calcination is performed in some embodiments at temperatures of at least about 200° C., at least about 500° C., at least about 1000° C., from about 200° C. to about 1200° C. or from about 200° C. to about 700° C. The calcining can be for a suitable period, e.g., from about 0.1 hour to about 12 hours or from about 1 hour to about 8.0 hours. In other embodiments, the calcining can be for at least about 0.1 hour, at least about 1 hour, at least about 5 hours or at least about 10 hours.

Alternatively, a liquid dispersion comprising polymer nanoparticles and metal oxide is formed with an oil dispersed phase and a continuous water phase to form an oil-in-water emulsion. The oil droplets may be collected and dried as are aqueous droplets.

Alternatively, a liquid dispersion of polymer nanoparticles and metal oxide is prepared and is spray-dried to form the polymer template microspheres without forming a liquid-in-liquid emulsion. In certain embodiments of spray-drying techniques, a liquid solution or dispersion is fed (e.g. pumped) to an atomizing nozzle associated with a compressed gas inlet. The feed is pumped through the atomizing nozzle to form liquid droplets. The droplets are surrounded by a pre-heated gas in an evaporation chamber, resulting in evaporation of solvent to produce solid particles. The dried particles are carried by the drying gas through a cyclone and deposited in a collection chamber. Gases include nitrogen and/or air. In an embodiment of a present spray-drying process, a liquid feed contains a water or oil phase, polymer particles and metal oxide. In an embodiment of a present spray-drying process, a liquid feed contains a water or oil phase, polymer particles and optionally metal oxide. Provided are polymer template microspheres containing polymer nano spheres with metal oxide in the interstitial spaces between the polymer nanospheres. The polymer nanospheres define the interstitial spaces. Spray-drying techniques include ink jet spray-drying methods and equipment.

In present spray-drying techniques, air may be considered a continuous phase with a dispersed liquid phase (a liquid-in-gas emulsion). In certain embodiments, spray-drying comprises an inlet temperature of from any of about 100° C., about 105° C., about 110° C., about 115° C., about 120° C., about 130° C., about 140° C., about 150° C., about 160° C. or about 170° C. to any of about 180° C., about 190° C., about 200° C., about 210° C., about 215° C. or about 220° C. In some embodiments a pump rate (feed flow rate) of from any of about 1 mL/min, about 2 mL/min, about 5 mL/min, about 6 mL/min, about 8 mL/min, about 10 mL/min, about 12 mL/min, about 14 mL/min or about 16 mL/min to any of about 18 mL/min, about 20 mL/min, about 22 mL/min, about 24 mL/min, about 26 mL/min, about 28 mL/min or about 30 mL/min is employed. Spray-drying techniques are disclosed for example in US2016/0170091.

Figure 4:
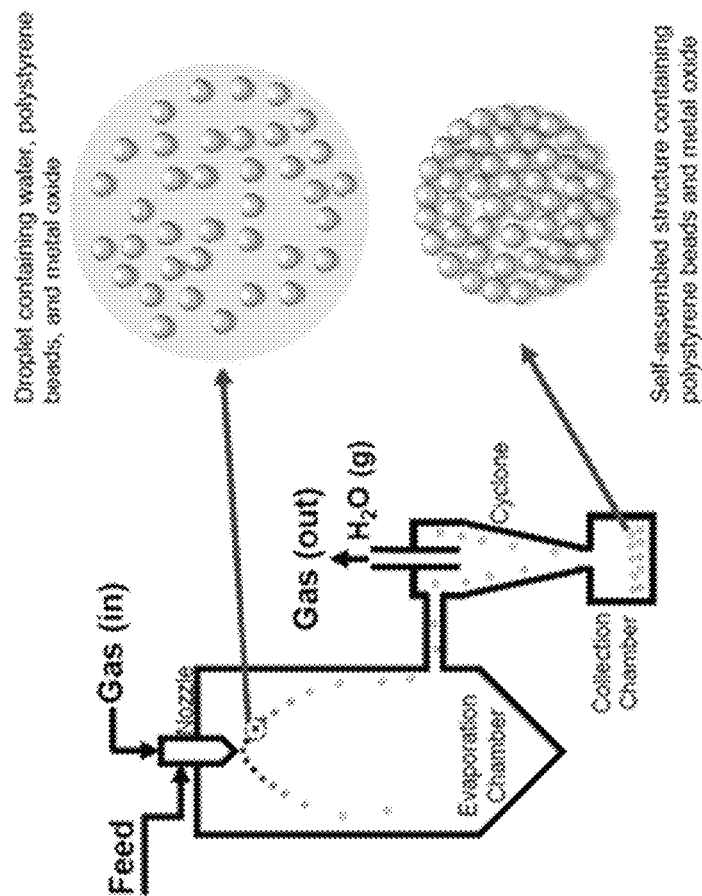
FIG. 4 is a representation of a spray-drying process according to some embodiments of the invention.

FIG. 4 is a representation of a spray-drying process according to some embodiments of the invention.

The microspheres are spherical or spherical-like and are micron-scaled, for example having average diameters from about 0.5 microns (μm) to about 100 μm. The polymer nanoparticles employed as a template are also spherical, are nano-scaled and are monodisperse, having average diameters for instance from about 50 nm to about 999 nm. The metal oxide employed may also be in particle form, which particles may be nano-scaled.

The metal oxide of the dispersion may be provided as metal oxide or may be provided from a metal oxide precursor, for instance via a sol-gel technique.

Drying of the polymer/metal oxide droplets followed by removal of the polymer provides microspheres having uniform voids (pores). In general, in the present processes, each droplet provides a single microsphere. The pore diameters are dependent on the size of the polymer particles. Some "shrinkage" or compaction may occur upon polymer removal, providing pore sizes somewhat smaller than the original polymer particle size, for example from about 10% to about 40% smaller than the polymer particle size. The pore diameters are uniform as are the polymer particle shape and size.

Pore diameters may range in some embodiments from about 50 nm to about 999 nm.

The average porosity of the present metal oxide microspheres may be relatively high, for example from about 0.10 or about 0.30 to about 0.80 or about 0.90. Average porosity of a microsphere means the total pore volume, as a fraction of the volume of the entire microsphere. Average porosity may be called "volume fraction."

In some embodiments, a porous microsphere may have a solid core (center) where the porosity is in general towards the exterior surface of the microsphere. In other embodiments, a porous microsphere may have a hollow core where a major portion of the porosity is towards the interior of the microsphere. In other embodiments, the porosity may be distributed throughout the volume of the microsphere. In other embodiments, the porosity may exist as a gradient, with higher porosity towards the exterior surface of the microsphere and lower or no porosity (solid) towards the center; or with lower porosity towards the exterior surface and with higher or complete porosity (hollow) towards the center.

For any porous microsphere, the average microsphere diameter is larger than the average pore diameter, for example, the average microsphere diameter is at least about 25 times, at least about 30 times, at least about 35 times, or at least about 40 times larger than the average pore diameter.

In some embodiments, the ratio of average microsphere diameter to average pore diameter is for instance from any of about 40/1, about 50/1, about 60/1, about 70/1, about 80/1, about 90/1, about 100/1, about 110/1, about 120/1, about 130/1, about 140/1, about 150/1, about 160/1, about 170/1, about 180/1 or about 190/1 to any of about 200/1, about 210/1, about 220/1, about 230/1, about 240/1, about 250/1, about 260/1, about 270/1, about 280/1, about 290/1, about 300/1, about 310/1, about 320/1, about 330/1, about 340/1 or about 350/1.

Polymer template microspheres comprising monodisperse polymer nanospheres may provide, when the polymer is removed, metal oxide microspheres having pores that in general have similar pore diameters.

Without wishing to be bound by theory, it is believed that bulk samples of microspheres exhibit saturated color with reduced unwanted light scattering when porosity and/or microsphere diameter and/or pore diameter are within a certain range. Color properties of a bulk sample are important, as colorants are employed in bulk, for instance in a paint, an ink, a coating, a cosmetic or a material for a medical application or a security application. In some embodiments, white microspheres are desirable, for example for use as white colorants.

The porous microspheres comprise mainly metal oxide, that is, they may consist essentially of or consist of metal oxide. Advantageously, a bulk sample of the porous microspheres exhibits color observable by the human eye. A light absorber may also be present in the microspheres, which may provide a more saturated observable color. Absorbers include inorganic and organic pigments, for example a broadband absorber such as carbon black. Absorbers may for instance be added by physically mixing the microspheres and the absorbers together or by including the absorbers in the droplets to be dried. For carbon black, controlled calcination may be employed to produce carbon black in situ from polymer decomposition. A present microsphere may exhibit no observable color without added light absorber and exhibit observable color with added light absorber.

The porous microspheres may be employed as colorants for example for aqueous formulations, oil-based formulations, inks, coatings formulations, foods, plastics, cosmetics formulations or materials for medical applications or security applications. Coatings formulations include for instance architectural coatings, automotive coatings, varnishes, etc.

The present porous metal oxide microspheres may exhibit angle-dependent color or angle-independent color. "Angle-dependent" color means that observed color has dependence on the angle of incident light on a sample or on the angle between the observer and the sample. "Angle-independent" color means that observed color has substantially no dependence on the angle of incident light on a sample or on the angle between the observer and the sample.

Angle-dependent color may be achieved for example with the use of monodisperse polymer nanospheres. Angle-dependent color may also be achieved when a step of drying the liquid droplets to provide polymer template micro spheres is performed slowly, allowing the polymer nanospheres to become ordered. Angle-independent color may be achieved when a step of drying the liquid droplets is performed quickly, not allowing the polymer nanospheres to become ordered.

For instance, the porous microspheres may comprise from about 60.0 wt % (weight percent) to about 99.9 wt % metal oxide and from about 0.1 wt % to about 40.0 wt % of one or more light absorbers, based on the total weight of the microspheres.

Advantageously, the porous microspheres may also be monodisperse.

According to the invention, particle size is synonymous with particle diameter and is determined for instance by scanning electron microscopy (SEM) or transmission electron microscopy (TEM). Average particle size is synonymous with D50, meaning half of the population resides above this point, and half below. Particle size refers to primary particles. Particle size may be measured by laser light scattering techniques, with dispersions or dry powders.

Mercury porosimetry analysis was used to characterize the porosity of the microspheres. Mercury porosimetry applies controlled pressure to a sample immersed in mercury. External pressure is applied for the mercury to penetrate into the voids/pores of the material. The amount of pressure required to intrude into the voids/pores is inversely proportional to the size of the voids/pores. The mercury porosimeter generates volume and pore size distributions from the pressure versus intrusion data generated by the instrument using the Washburn equation. For example, porous silica microspheres containing voids/pores with an average size of 165 nm have an average porosity of 0.8.

The term "bulk sample" means a population of microspheres. For example, a bulk sample of microspheres is simply a bulk population of microspheres, for instance ≤0.1 mg, ≤0.2 mg, ≤0.3 mg, ≤0.4 mg, ≤0.5 mg, ≤0.7 mg, ≤1.0 mg, ≤2.5 mg, ≤5.0 mg, ≤10.0 mg or ≤25.0 mg. A bulk sample of microspheres may be substantially free of other components. The term "porous microspheres" may mean a bulk sample.

The phrase "exhibits color observable by the human eye" means color will be observed by an average person. This may be for any bulk sample distributed over any surface area, for instance a bulk sample distributed over a surface area of from any of about 1 $cm^2$, about 2 $cm^2$, about 3 $cm^2$, about 4 $cm^2$, about 5 $cm^2$ or about 6 $cm^2$ to any of about 7 $cm^2$, about 8 $cm^2$, about 9 $cm^2$, about 10 $cm^2$, about 11 $cm^2$, about 12 $cm^2$, about 13 $cm^2$, about 14 $cm^2$ or about 15 $cm^2$. It may also mean observable by a CIE 1931 2° standard observer and/or by a CIE 1964 10° standard observer. The background for color observation may be any background, for instance a white background, black background or a dark background anywhere between white and black.

The term "of" may mean "comprising", for instance "a liquid dispersion of" may be interpreted as "a liquid dispersion comprising".

The terms "microspheres", "nanospheres", "droplets", etc., referred to herein may mean for example a plurality thereof, a collection thereof, a population thereof, a sample thereof or a bulk sample thereof.

The term "micro" or "micro-scaled" means from about 0.5 μm to about 999 μm. The term "nano" or "nano-scaled" means from about 1 nm to about 999 nm.

The terms "spheres" and "particles" may be interchangeable.

The term "monodisperse" in reference to a population of microspheres or nanospheres means particles having generally uniform shapes and generally uniform diameters. A present monodisperse population of microspheres or nanospheres for instance may have 90%, 91%, 92%, 93%, 94%, 95%, 96%, 97%, 98% or 99% of the particles by number having diameters within ±7%, ±6%, ±5%, ±4%, ±3%, ±2% or ±1% of the average diameter of the population.

A "substrate" may mean an aqueous-based or an oil-based substrate or "media", which substrate may be a minor part or a major part of a final composition. A substrate may also mean a solid, a semi-solid, a gel, a liquid, a paste, a cream, etc.

Removal of a monodisperse population of polymer nanospheres provides porous metal oxide microspheres having a corresponding population of pores having an average pore diameter.

The term "substantially free of other components" means for example containing ≤5%, ≤4%, ≤3%, ≤2%, ≤1% or ≤0.5% by weight of other components.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±□2%, ±□1%, ±□0.5%, ±□0.4%, ±□0.3%, ±□0.2%, ±□0.1% or ±□0.05%. All numeric values are modified by the term "about" whether or not explicitly indicated. Numeric values modified by the term "about" include the specific identified value. For example "about 5.0" includes 5.0.

U.S. patents, U.S. patent applications and published U.S. patent applicants discussed herein are hereby incorporated by reference.

Unless otherwise indicated, all parts and percentages are by weight. Weight percent (wt %), if not otherwise indicated, is based on an entire composition free of any volatiles, that is, based on dry solids content.

A non-limiting first set of embodiments of the invention directed towards methods of preparing porous metal oxide microspheres includes:

In a first embodiment, disclosed is a method to prepare porous metal oxide microspheres comprising a metal oxide, the method comprising forming a liquid dispersion of polymer nanoparticles and a metal oxide; forming liquid droplets of the dispersion; drying the liquid droplets to provide polymer template microspheres comprising polymer nanospheres and metal oxide; and removing the polymer nanospheres from the template microspheres to provide the porous metal oxide microspheres.

In a second embodiment, a method according to the first embodiment, comprising forming a liquid dispersion of polymer nanoparticles and the metal oxide, spray-drying the liquid dispersion to provide polymer template microspheres and removing the polymer nanospheres from the template microspheres.

In a third embodiment, a method according to the first embodiment, comprising forming the liquid droplets with a vibrating nozzle. In a fourth embodiment, a method according to embodiments 1 to 3, wherein the liquid droplets are aqueous droplets. In a fifth embodiment, a method according to embodiments 1 to 3, wherein the liquid droplets are oil droplets.

In a sixth embodiment, a method according to embodiment 1, comprising providing a continuous phase and mixing the liquid dispersion with the continuous phase to form an emulsion containing dispersed liquid dispersion droplets. In a seventh embodiment, a method according to embodiment 6, comprising providing a continuous oil phase and mixing an aqueous dispersion with the continuous oil phase to form a water-in-oil emulsion containing aqueous droplets. In an eighth embodiment, a method according to embodiment 6, comprising providing a continuous aqueous phase and mixing an oil dispersion with the continuous phase to form an oil-in-water emulsion containing oil droplets.

In a ninth embodiment, a method according to embodiments 6 to 8, comprising collecting the droplets. In a tenth embodiment, a method according to embodiment 9, comprising drying the droplets to provide polymer template microspheres comprising polymer nanospheres and metal oxide and removing the polymer nanospheres from the template microspheres.

In an eleventh embodiment, a method according to embodiments 6 to 10 wherein drying the droplets comprises microwave irradiation, oven drying, drying under vacuum, drying in the presence of a desiccant, or a combination thereof.

In a twelfth embodiment, a method according to embodiments 7 to 11, wherein the oil phase or dispersion comprises a hydrocarbon, a silicone oil or a fluorinated oil. In a thirteenth embodiment, a method according to embodiments 6 to 12, wherein forming the droplets occurs in a microfluidic device. In a fourteenth embodiment, a method according to embodiments 6 to 13, wherein forming the droplets occurs in a microfluidic device which contains a droplet junction having a channel width of from any of about 10 μm, about 15 μm, about 20 μm, about 25 μm, about 30 μm, about 35 μm, about 40 μm or about 45 μm to any of about 50 μm, about 55 μm, about 60 μm, about 65 μm, about 70 μm, about 75 μm, about 80 μm, about 85 μm, about 90 μm, about 95 μm or about 100 μm. In a fifteenth embodiment, a method according to embodiments 13 or 14, comprising collecting the droplets from the microfluidic device.

In a sixteenth embodiment, a method according to any of the preceding embodiments, wherein the wt/wt ratio of polymer nanoparticles to the metal oxide is from any of about 0.1/1, about 0.5/1, about 1.0/1, about 1.5/1, about 2.0/1, about 2.5/1 or about 3.0/1 to any of about 3.5/1, about 4.0/1, about 5.0/1, about 5.5/1, about 6.0/1, about 6.5/1, about 7.0/1, about 8.0/1, about 9.0/1 or about 10.0/1.

In a seventeenth embodiment, a method according to any of the preceding embodiments, wherein the polymer nanoparticles have an average diameter of from any of about 50 nm, about 75 nm, about 100 nm, about 130 nm, about 160 nm, about 190 nm, about 210 nm, about 240 nm, about 270 nm, about 300 nm, about 330 nm, about 360 nm, about 390 nm, about 410 nm, about 440 nm, about 470 nm, about 500 nm, about 530 nm, about 560 nm, about 590 nm or about 620 nm to any of about 650 nm, about 680 nm, about 710 nm, about 740 nm, about 770 nm, about 800 nm, about 830 nm, about 860 nm, about 890 nm, about 910 nm, about 940 nm, about 970 nm or about 990 nm.

In an eighteenth embodiment, a method according to any of the preceding embodiments, wherein the polymer is selected from the group consisting of poly(meth)acrylic acid, poly(meth)acrylates, polystyrenes, polyacrylamides, polyethylene, polypropylene, polylactic acid, polyacrylonitrile, derivatives thereof, salts thereof, copolymers thereof and combinations thereof.

In a nineteenth embodiment, a method according to any of the preceding embodiments, wherein the polymer is selected from the group consisting of polystyrenes, for example polystyrene copolymers such as polystyrene/acrylic acid, polystyrene/poly(ethylene glycol) methacrylate or polystyrene/styrene sulfonate. In a twentieth embodiment, a method according to any of the preceding embodiments, wherein the metal oxide is one or more of silica, titania, alumina, zirconia, ceria, iron oxides, zinc oxide, indium oxide, tin oxide or chromium oxide.

In a twenty-first embodiment, a method according to any of the preceding embodiments, wherein the porous microspheres have an average diameter of from about 0.5 µm to about 100 µm, an average porosity of from about 0.10 to about 0.90 or from about 0.10 to about 0.80, and an average pore diameter of from about 50 nm to about 999 nm.

In a twenty-second embodiment, a method according to any of the preceding embodiments, wherein the porous microspheres have an average diameter of from about 1 µm to about 75 µm, from about 2 µm to about 70 µm, from about 3 µm to about 65 µm, from about 4 µm to about 60 µm, from about 5 µm to about 55 µm or from about 5 µm to about 50 µm; for example from any of about 5 µm, about 6 µm, about 7 µm, about 8 µm, about 9 µm, about 10 µm, about 11 µm, about 12 µm, about 13 µm, about 14 µm or about 15 µm to any of about 16 µm, about 17 µm, about 18 µm, about 19 µm, about 20 µm, about 21 µm, about 22 µm, about 23 µm, about 24 µm or about 25 µm.

In a twenty-third embodiment, a method according to any of the preceding embodiments, wherein the porous microspheres have an average porosity of from any of about 0.10, about 0.12, about 0.14, about 0.16, about 0.18, about 0.20, about 0.22, about 0.24, about 0.26, about 0.28, about 0.30, about 0.32, about 0.34, about 0.36, about 0.38, about 0.40, about 0.42, about 0.44, about 0.46, about 0.48 about 0.50, about 0.52, about 0.54, about 0.56, about 0.58 or about 0.60 to any of about 0.62, about 0.64, about 0.66, about 0.68, about 0.70, about 0.72, about 0.74, about 0.76, about 0.78, about 0.80 or about 0.90.

In a twenty-fourth embodiment, a method according to any of the preceding embodiments, wherein the porous microspheres have an average pore diameter of from any of about 50 nm, about 60 nm, about 70 nm, 80 nm, about 100 nm, about 120 nm, about 140 nm, about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm or about 440 nm to any of about 460 nm, about 480 nm, about 500 nm, about 520 nm, about 540 nm, about 560 nm, about 580 nm, about 600 nm, about 620 nm, about 640 nm, about 660 nm, about 680 nm, about 700 nm, about 720 nm, about 740 nm, about 760 nm, about 780 nm or about 800 nm.

In a twenty-fifth embodiment, a method according to any of the preceding embodiments, wherein the porous microspheres have an average diameter of from any of about 4.5 µm, about 4.8 µm, about 5.1 µm, about 5.4 µm, about 5.7 µm, about 6.0 µm, about 6.3 µm, about 6.6 µm, about 6.9 µm, about 7.2 µm or about 7.5 µm to any of about 7.8 µm about 8.1 µm, about 8.4 µm, about 8.7 µm, about 9.0 µm, about 9.3 µm, about 9.6 µm or about 9.9 µm.

In a twenty-sixth embodiment, a method according to any of the preceding embodiments, wherein the porous microspheres have an average porosity of from any of about 0.45, about 0.47, about 0.49, about 0.51, about 0.53, about 0.55 or about 0.57 to any of about 0.59, about 0.61, about 0.63 or about 0.65.

In a twenty-seventh embodiment, a method according to any of the preceding embodiments, wherein the porous microspheres have an average pore diameter of from any of about 220 nm, about 225 nm, about 230 nm, about 235 nm, about 240 nm, about 245 nm or about 250 nm to any of about 255 nm, about 260 nm, about 265 nm, about 270 nm, about 275 nm, about 280 nm, about 285 nm, about 290 nm, about 295 nm or about 300 nm.

In a twenty-eighth embodiment, a method according to any of the preceding embodiments, wherein the porous microspheres have an average diameter of from any of about 4.5 µm, about 4.8 µm, about 5.1 µm, about 5.4 µm, about 5.7 µm, about 6.0 µm, about 6.3 µm, about 6.6 µm, about 6.9 µm, about 7.2 µm or about 7.5 µm to any of about 7.8 µm about 8.1 µm, about 8.4 µm, about 8.7 µm, about 9.0 µm, about 9.3 µm, about 9.6 µm or about 9.9 µm; an average porosity of from any of about 0.45, about 0.47, about 0.49, about 0.51, about 0.53, about 0.55 or about 0.57 to any of about 0.59, about 0.61, about 0.63 or about 0.65; and an average pore diameter of from any of about 220 nm, about 225 nm, about 230 nm, about 235 nm, about 240 nm, about 245 nm or about 250 nm to any of about 255 nm, about 260 nm, about 265 nm, about 270 nm, about 275 nm, about 280 nm, about 285 nm, about 290 nm, about 295 nm or about 300 nm.

In a twenty-ninth embodiment, a method according to any of the preceding embodiments, wherein the porous microspheres comprise from any of about 60.0 wt % to about 99.9 wt % metal oxide, for example comprising from any of about 60.0 wt %, about 64.0 wt %, about 67.0 wt %, about 70.0 wt %, about 73.0 wt %, about 76.0 wt %, about 79.0 wt %, about 82.0 wt % or about 85.0 wt % to any of about 88.0 wt %, about 91.0 wt %, about 94.0 wt %, about 97.0 wt %, about 98.0 wt %, about 99.0 wt % or about 99.9 wt % metal oxide, based on the total weight of the microspheres.

In a thirtieth embodiment, a method according to any of the preceding embodiments, wherein the porous microspheres comprise from about 0.1 wt % to about 40.0 wt % of one or more light absorbers, for example comprising from any of about 0.1 wt %, about 0.3 wt %, about 0.5 wt %, about 0.7 wt %, about 0.9 wt %, about 1.0 wt %, about 1.5 wt %, about 2.0 wt %, about 2.5 wt %, about 5.0 wt %, about 7.5 wt %, about 10.0 wt %, about 13.0 wt %, about 17.0 wt %, about 20.0 wt % or about 22.0 wt % to any of about 24.0 wt %, about 27.0 wt %, about 29.0 wt %, about 31.0 wt %, about 33.0 wt %, about 35.0 wt %, about 37.0 wt %, about 39.0 wt % or about 40.0 wt % of one or more light absorbers, based on the total weight of the microspheres.

In a thirty-first embodiment, a method according to any of the preceding embodiments, wherein the porous microspheres comprise one or more light absorbers selected from the group consisting of inorganic and organic pigments, for example carbon black.

In a thirty-second embodiment, a method according to any of the preceding embodiments, wherein a bulk sample of the porous microspheres exhibits color observable by the human eye. In a thirty-third embodiment, a method according to any of the preceding embodiments, wherein a bulk sample of the porous microspheres exhibits angle-independent color observable by the human eye. In a thirty-fourth embodiment, a method according to any of embodiments 1-32, wherein a bulk sample of the porous microspheres exhibits angle-dependent color observable by the human eye.

In a thirty-fifth embodiment, a method according to any of the preceding embodiments, wherein the porous microspheres are monodisperse. In a thirty-sixth embodiment, a method according to any of the preceding embodiments, wherein the porous metal oxide microspheres are a bulk sample of microspheres.

In a thirty-seventh embodiment, a method according to any of the preceding embodiments, wherein removing the polymer nanospheres from the template microspheres comprises calcination, pyrolysis or solvent removal.

In a thirty-eighth embodiment, a method according to any of the preceding embodiments, wherein removing the polymer nanospheres comprises calcining the template microspheres at temperatures of from any of about 200° C., about 350° C., about 400° C., 450° C., about 500° C. or about 550° C. to any of about 600° C., about 650° C., about 700° C. or about 1200° C. for a period of from any of about 0.1 h (hour), 1 h, about 1.5 h, about 2.0 h, about 2.5 h, about 3.0 h, about 3.5 h or about 4.0 h to any of about 4.5 h, about 5.0 h, about 5.5 h, about 6.0 h, about 6.5 h, about 7.0 h, about 7.5 h about 8.0 h or about 12 h. Alternatively, the calcining can be at temperatures of at least about 200° C., at least about 500° C., or at least about 1000° C., for a suitable period, e.g., for at least about 0.1 hour, at least about 1 hour, at least about 5 hours or at least about 10 hours.

In a thirty-ninth embodiment, disclosed are porous microspheres prepared according to any of the preceding methods. In a fortieth embodiment, disclosed is a bulk sample of porous microspheres prepared according to any of the preceding methods.

A non-limiting second set of embodiments of the invention directed towards porous metal oxide microspheres includes:

In a first embodiment, porous microspheres comprising a metal oxide, wherein the microspheres have an average diameter of from about 0.5 μm to about 100 μm, an average porosity of from about 0.10 to about 0.90 or from about 0.10 to about 0.80 and an average pore diameter of from about 50 nm to about 999 nm.

In a second embodiment, disclosed are porous microspheres according to embodiment 1, which have an average diameter of from about 1 μm to about 75 μm, about 2 μm to about 70 μm, from about 3 μm to about 65 μm, from about 4 μm to about 60 μm, from about 5 μm to about 55 μm or from about 5 μm to about 50 μm; for example from any of about 5 μm, about 6 μm, about 7 μm, about 8 μm, about 9 μm, about 10 μm, about 11 μm, about 12 μm, about 13 μm, about 14 μm or about 15 μm to any of about 16 μm, about 17 μm, about 18 μm, about 19 μm, about 20 μm, about 21 μm, about 22 μm, about 23 μm, about 24 μm or about 25 μm.

In a third embodiment, the porous microspheres according to embodiments 1 or 2, which have an average porosity of from any of about 0.10, about 0.12, about 0.14, about 0.16, about 0.18, about 0.20, about 0.22, about 0.24, about 0.26, about 0.28, about 0.30, about 0.32, about 0.34, about 0.36, about 0.38, about 0.40, about 0.42, about 0.44, about 0.46, about 0.48 about 0.50, about 0.52, about 0.54, about 0.56, about 0.58 or about 0.60 to any of about 0.62, about 0.64, about 0.66, about 0.68, about 0.70, about 0.72, about 0.74, about 0.76, about 0.78, about 0.80 or about 0.90.

In a fourth embodiment, the porous microspheres according to any of the preceding embodiments, which have an average pore diameter of from any of about 50 nm, about 60 nm, about 70 nm, about 80 nm, about 100 nm, about 120 nm, about 140 nm, about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm or about 440 nm to any of about 460 nm, about 480 nm, about 500 nm, about 520 nm, about 540 nm, about 560 nm, about 580 nm, about 600 nm, about 620 nm, about 640 nm, about 660 nm, about 680 nm, about 700 nm, about 720 nm, about 740 nm, about 760 nm, about 780 nm or about 800 nm.

In a fifth embodiment, the porous microspheres according to any of the preceding embodiments, which have an average diameter of from any of about 4.5 μm, about 4.8 μm, about 5.1 μm, about 5.4 μm, about 5.7 μm, about 6.0 μm, about 6.3 μm, about 6.6 μm, about 6.9 μm, about 7.2 μm or about 7.5 μm to any of about 7.8 μm about 8.1 μm, about 8.4 μm, about 8.7 μm, about 9.0 μm, about 9.3 μm, about 9.6 μm or about 9.9 μm. In a sixth embodiment, the porous microspheres according to any of the preceding embodiments, which have an average porosity of from any of about 0.45, about 0.47, about 0.49, about 0.51, about 0.53, about 0.55 or about 0.57 to any of about 0.59, about 0.61, about 0.63 or about 0.65. In a seventh embodiment, the porous microspheres according to any of the preceding embodiments, which have an average pore diameter of from any of about 220 nm, about 225 nm, about 230 nm, about 235 nm, about 240 nm, about 245 nm or about 250 nm to any of about 255 nm, about 260 nm, about 265 nm, about 270 nm, about 275 nm, about 280 nm, about 285 nm, about 290 nm, about 295 nm or about 300 nm.

In an eighth embodiment, the porous microspheres according to any of the preceding embodiments, which have an average diameter of from any of about 4.5 μm, about 4.8 μm, about 5.1 μm, about 5.4 μm, about 5.7 μm, about 6.0 μm, about 6.3 μm, about 6.6 μm, about 6.9 μm, about 7.2 μm or about 7.5 μm to any of about 7.8 μm about 8.1 μm, about 8.4 μm, about 8.7 μm, about 9.0 μm, about 9.3 μm, about 9.6 μm or about 9.9 μm; and which have an average porosity of from any of about 0.45, about 0.47, about 0.49, about 0.51, about 0.53, about 0.55 or about 0.57 to any of about 0.59, about 0.61, about 0.63 or about 0.65; and which have an average pore diameter of from any of about 220 nm, about 225 nm, about 230 nm, about 235 nm, about 240 nm, about 245 nm or about 250 nm to any of about 255 nm, about 260 nm, about 265 nm, about 270 nm, about 275 nm, about 280 nm, about 285 nm, about 290 nm, about 295 nm or about 300 nm.

In a ninth embodiment, the porous microspheres according to any of the preceding embodiments, comprising from about 60.0 wt % to about 99.9 wt % metal oxide, for example comprising from any of about 60.0 wt %, about 64.0 wt %, about 67.0 wt %, about 70.0 wt %, about 73.0 wt %, about 76.0 wt %, about 79.0 wt %, about 82.0 wt % or about 85.0 wt % to any of about 88.0 wt %, about 91.0 wt %, about 94.0 wt %, about 97.0 wt %, about 98.0 wt %, about 99.0 wt % or about 99.9 wt % metal oxide, based on the total weight of the microspheres.

In a tenth embodiment, the porous microspheres according to any of the preceding embodiments, wherein the metal oxide is selected from the group consisting of silica, titania, alumina, zirconia, ceria, iron oxides, zinc oxide, indium oxide, tin oxide, chromium oxide and combinations thereof. In an eleventh embodiment, the porous microspheres according to any of the preceding embodiments, wherein the metal oxide is selected from the group consisting of silica, titania, alumina and combinations thereof.

In a twelfth embodiment, the porous microspheres according to any of the preceding embodiments, comprising from about 0.1 wt % to about 40.0 wt % of one or more light absorbers, for example comprising from any of about 0.1 wt %, about 0.3 wt %, about 0.5 wt %, about 0.7 wt %, about 0.9 wt %, about 1.0 wt %, about 1.5 wt %, about 2.0 wt %, about 2.5 wt %, about 5.0 wt %, about 7.5 wt %, about 10.0 wt %, about 13.0 wt %, about 17.0 wt %, about 20.0 wt % or about 22.0 wt % to any of about 24.0 wt %, about 27.0 wt %, about 29.0 wt %, about 31.0 wt %, about 33.0 wt %, about 35.0 wt %, about 37.0 wt %, about 39.0 wt % or about 40.0 wt % of one or more light absorbers, based on the total weight of the microspheres. In a thirteenth embodiment, the porous microspheres according to any of the preceding embodiments, comprising one or more light absorbers selected from the group consisting of inorganic and organic pigments, for example carbon black.

In a fourteenth embodiment, the porous microspheres according to any of the preceding embodiments, wherein a bulk sample of the porous microspheres exhibits color observable by the human eye. In a fifteenth embodiment, the porous microspheres according to any of the preceding embodiments, wherein a bulk sample of the porous microspheres exhibits angle-independent color observable by the human eye. In a sixteenth embodiment, the porous microspheres according to any of embodiments 1-14, wherein a bulk sample of the porous microspheres exhibits angle-dependent color observable by the human eye.

In a seventeenth embodiment, the porous microspheres according to any of the preceding embodiments which are monodisperse. In an eighteenth embodiment, a composition comprising a substrate and the porous microspheres according to any of the preceding embodiments. In a nineteenth embodiment, a composition according to embodiment 18, which is an aqueous formulation, an oil-based formulation, an ink, a coating formulation, a food, a plastic, a cosmetic formulation or a material for a medical application or a security application.

A non-limiting third set of embodiments of the disclosure directed towards porous metal oxide microspheres includes:

In a first embodiment, disclosed are porous microspheres comprising a metal oxide, wherein a bulk sample of the porous microspheres exhibits color observable by the human eye.

In a second embodiment, the porous microspheres according to embodiment 1, wherein the microspheres have an average diameter of from about 0.5 µm to about 100 µm, an average porosity of from about 0.10 to about 0.90 or from about 0.10 to about 0.80 and an average pore diameter of from about 50 nm to about 999 nm.

In a third embodiment, the porous microspheres according to embodiments 1 or 2, which have an average diameter of from about 1 µm to about 75 µm, about 2 µm to about 70 µm, from about 3 µm to about 65 µm, from about 4 µm to about 60 µm, from about 5 µm to about 55 µm or from about 5 µm to about 50 µm; for example from any of about 5 µm, about 6 µm, about 7 µm, about 8 µm, about 9 µm, about 10 µm, about 11 µm, about 12 µm, about 13 µm, about 14 µm or about 15 µm to any of about 16 µm, about 17 µm, about 18 µm, about 19 µm, about 20 µm, about 21 µm, about 22 µm, about 23 µm, about 24 µm or about 25 µm.

In a fourth embodiment, the porous microspheres according to any of the preceding embodiments, which have an average porosity of from any of about 0.10, about 0.12, about 0.14, about 0.16, about 0.18, about 0.20, about 0.22, about 0.24, about 0.26, about 0.28, about 0.30, about 0.32, about 0.34, about 0.36, about 0.38, about 0.40, about 0.42, about 0.44, about 0.46, about 0.48 about 0.50, about 0.52, about 0.54, about 0.56, about 0.58 or about 0.60 to any of about 0.62, about 0.64, about 0.66, about 0.68, about 0.70, about 0.72, about 0.74, about 0.76, about 0.78, or about 0.80 or about 0.90.

In a fifth embodiment, the porous microspheres according to any of the preceding embodiments, which have an average pore diameter of from any of about 50 nm, about 60 nm, about 70 nm, about 80 nm, about 100 nm, about 120 nm, about 140 nm, about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm or about 440 nm to any of about 460 nm, about 480 nm, about 500 nm, about 520 nm, about 540 nm, about 560 nm, about 580 nm, about 600 nm, about 620 nm, about 640 nm, about 660 nm, about 680 nm, about 700 nm, about 720 nm, about 740 nm, about 760 nm, about 780 nm or about 800 nm.

In a sixth embodiment, the porous microspheres according to any of the preceding embodiments, which have an average diameter of from any of about 4.5 µm, about 4.8 µm, about 5.1 µm, about 5.4 µm, about 5.7 µm, about 6.0 µm, about 6.3 µm, about 6.6 µm, about 6.9 µm, about 7.2 µm or about 7.5 µm to any of about 7.8 µm about 8.1 µm, about 8.4 µm, about 8.7 µm, about 9.0 µm, about 9.3 µm, about 9.6 µm or about 9.9 µm. In a seventh embodiment, the porous microspheres according to any of the preceding embodiments, which have an average porosity of from any of about 0.45, about 0.47, about 0.49, about 0.51, about 0.53, about 0.55 or about 0.57 to any of about 0.59, about 0.61, about 0.63 or about 0.65. In an eighth embodiment, the porous microspheres according to any of the preceding claims, which have an average pore diameter of from any of about 220 nm, about 225 nm, about 230 nm, about 235 nm, about 240 nm, about 245 nm or about 250 nm to any of about 255 nm, about 260 nm, about 265 nm, about 270 nm, about 275 nm, about 280 nm, about 285 nm, about 290 nm, about 295 nm or about 300 nm.

In a ninth embodiment, the porous microspheres according to any of the preceding embodiments, which have an average diameter of from any of about 4.5 µm, about 4.8 µm, about 5.1 µm, about 5.4 µm, about 5.7 µm, about 6.0 µm, about 6.3 µm, about 6.6 µm, about 6.9 µm, about 7.2 µm or about 7.5 µm to any of about 7.8 µm about 8.1 µm, about 8.4 µm, about 8.7 µm, about 9.0 µm, about 9.3 µm, about 9.6 µm or about 9.9 µm; and which have an average porosity of from any of about 0.45, about 0.47, about 0.49, about 0.51, about 0.53, about 0.55 or about 0.57 to any of about 0.59, about 0.61, about 0.63 or about 0.65; and which have an average pore diameter of from any of about 220 nm, about 225 nm, about 230 nm, about 235 nm, about 240 nm, about 245 nm or about 250 nm to any of about 255 nm, about 260 nm, about 265 nm, about 270 nm, about 275 nm, about 280 nm, about 285 nm, about 290 nm, about 295 nm or about 300 nm.

In a tenth embodiment, the porous microspheres according to any of the preceding embodiments, comprising from about 60.0 wt % to about 99.9 wt % metal oxide, for example comprising from any of about 60.0 wt %, about 64.0 wt %, about 67.0 wt %, about 70.0 wt %, about 73.0 wt %, about 76.0 wt %, about 79.0 wt %, about 82.0 wt % or about 85.0 wt % to any of about 88.0 wt %, about 91.0 wt %, about 94.0 wt %, about 97.0 wt %, about 98.0 wt %, about 99.0 wt % or about 99.9 wt % metal oxide, based on the total weight of the microspheres.

In an eleventh embodiment, the porous microspheres according to any of the preceding embodiments, wherein the metal oxide is selected from the group consisting of silica, titania, alumina, zirconia, ceria, iron oxides, zinc oxide, indium oxide, tin oxide, chromium oxide and combinations thereof. In a twelfth embodiment, the porous microspheres according to any of the preceding embodiments, wherein the metal oxide is selected from the group consisting of silica, titania, alumina and combinations thereof.

In a thirteenth embodiment, the porous microspheres according to any of the preceding embodiments, comprising from about 0.1 wt % to about 40.0 wt % of one or more light absorbers, for example comprising from any of about 0.1 wt %, about 0.3 wt %, about 0.5 wt %, about 0.7 wt %, about 0.9 wt %, about 1.0 wt %, about 1.5 wt %, about 2.0 wt %, about 2.5 wt %, about 5.0 wt %, about 7.5 wt %, about 10.0 wt %, about 13.0 wt %, about 17.0 wt %, about 20.0 wt % or about 22.0 wt % to any of about 24.0 wt %, about 27.0 wt %, about 29.0 wt %, about 31.0 wt %, about 33.0 wt %, about 35.0 wt %, about 37.0 wt %, about 39.0 wt % or about 40.0 wt % of one or more light absorbers, based on the total weight of the microspheres. In a fourteenth embodiment, the porous microspheres according to any of the preceding embodiments, comprising one or more light absorbers selected from the group consisting of inorganic and organic pigments, for example carbon black.

In a sixteenth embodiment, the porous microspheres according to any of the preceding embodiments, wherein a bulk sample of the porous microspheres exhibits color observable by the human eye.

In a seventeenth embodiment, porous microspheres according to any of the preceding embodiments which are monodisperse.

In an eighteenth embodiment, porous microspheres according to any of the preceding embodiments, wherein a bulk sample of the porous microspheres exhibits angle-independent color observable by the human eye. In a nineteenth embodiment, porous microspheres according to any of embodiments 1-17, wherein a bulk sample of the porous microspheres exhibits angle-dependent color observable by the human eye.

In a twentieth embodiment, a composition comprising a substrate and the porous microspheres according to any of the preceding embodiments. In a twenty-first embodiment, a composition according to embodiment 20, which is an aqueous formulation, an oil-based formulation, a coating formulation, a food, an ink, a plastic, a cosmetic formulation or a material for a medical application or a security application.

EXAMPLES

Example 1

Porous Silica Microspheres

A styrene/acrylic acid copolymer is prepared as follows: 230 mL deionized (DI) water is added to a 3-neck reaction flask equipped with a thermometer, condenser, magnetic stirring and nitrogen atmosphere. The water is heated to 80° C. and 10 g of styrene are added with stirring, followed by 100 mg acrylic acid dissolved in 10 mL DI water via syringe. 100 mg of ammonium persulfate is dissolved in 10 mL DI water and added to the stirred mixture via syringe. The reaction mixture is stirred for 24 hours at 80° C. The polymer colloid dispersion is allowed to cool to room temperature and is purified via centrifugation, producing polystyrene nanospheres having an average particle size of 250 nm.

The aqueous polystyrene colloid dispersion is diluted to 1 wt % with deionized water and 1 wt % silica nanoparticles are added and the mixture is sonicated to prevent particle agglomeration. A continuous oil phase contains 0.1 wt % polyethylene glycol/perfluoropolyether surfactant in a fluorinated oil. The aqueous colloid dispersion and oil are each injected into a microfluidic device having a 50 μm droplet junction via syringes associated with pumps. The system is allowed to equilibrate until monodisperse droplets are produced. The monodisperse droplets are collected in a reservoir.

Collected droplets are dried in an oven at 45° C. for 4 hours to provide monodisperse polymer template microspheres. The polymer template microspheres are calcined by placing on a silicon wafer, heating from room temperature to 500° C. over a 3 hour period, holding at 500° C. for 2 hours, and cooling back to room temperature over a 3 hour period. Provided are monodisperse silica microspheres having an average diameter of 15 microns.

Figure 2:
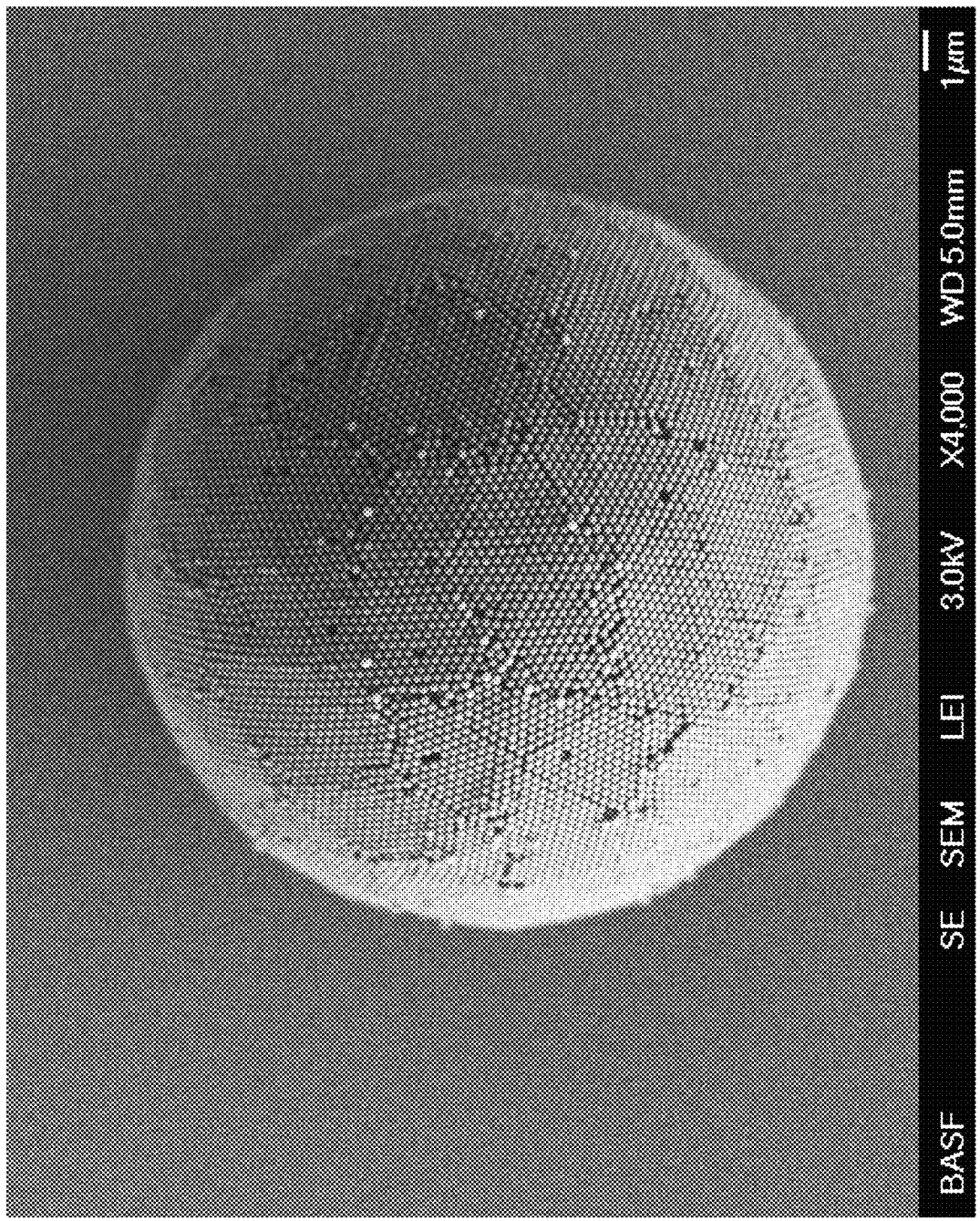
FIG. 2 is a scanning electron microscope (SEM) image of a polymer template microsphere, according to an embodiment of the invention.
Figure 3:
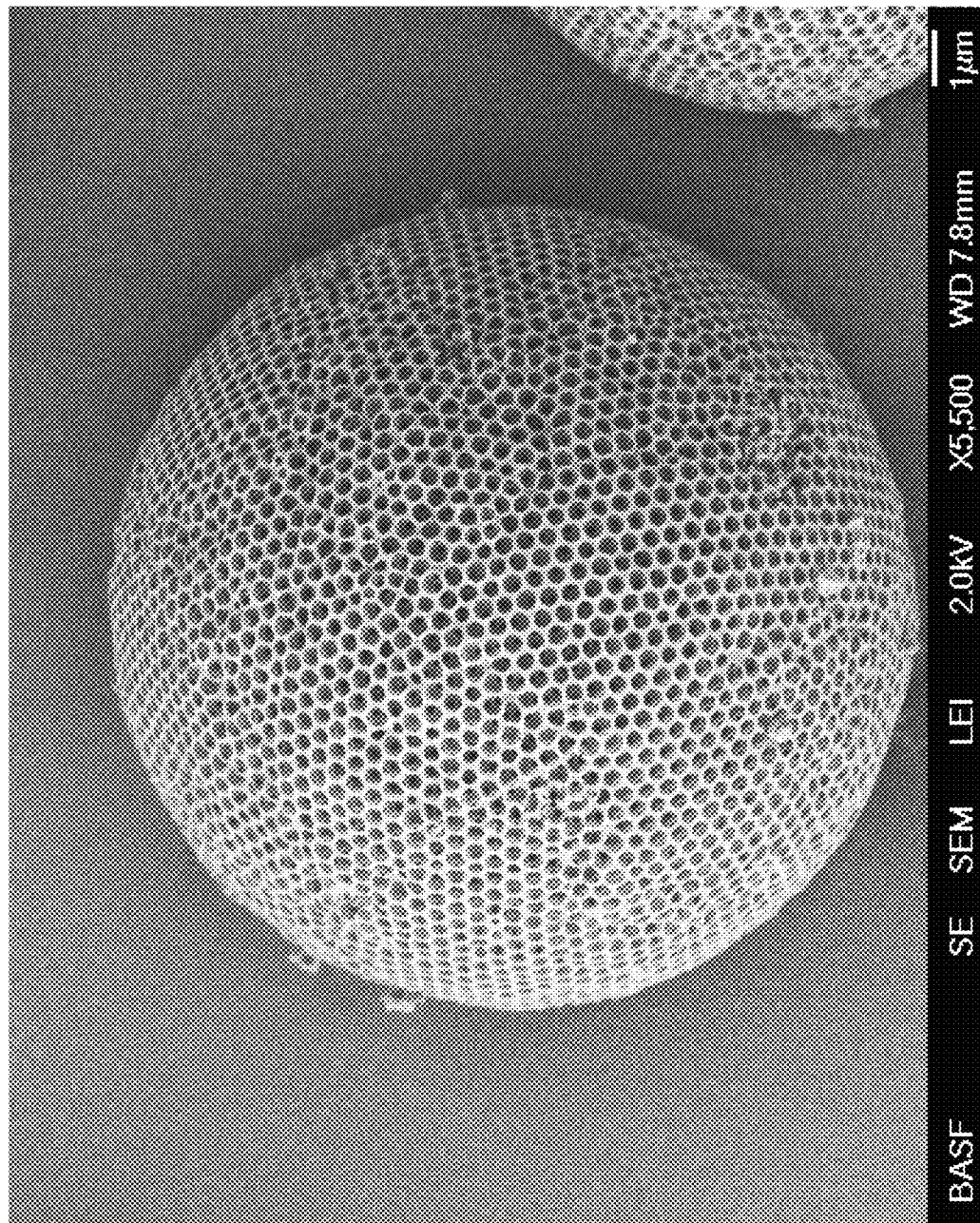
FIG. 3 is a SEM image of a porous silica microsphere, according to an embodiment of the invention.

FIG. 2 and FIG. 3 are scanning electron microscope (SEM) images of a polymer template microsphere and a porous silica microsphere prepared in a similar fashion.

Example 2

Porous Silica Microspheres Containing a Light Absorber

The product of Example 1 is physically mixed with an aqueous dispersion of carbon black or with a carbon black powder at varying weight levels. Provided are monodisperse porous silica microspheres containing carbon black at levels of 0.5 wt %, 1 wt %, 2 wt %, 3 wt %, 4 wt % and 5 wt %, based on the total weight of the microspheres.

Example 3

Drying Methods

Examples 1 and 2 are repeated, wherein the drying step employs microwave irradiation, drying under vacuum and/or drying in the presence of a desiccant.

Example 4

Preparation of Porous Silica Microspheres Via Spray-Drying

A styrene/acrylic acid copolymer is prepared as follows: 230 mL deionized (DI) water is added to a 3-neck reaction flask equipped with a thermometer, condenser, magnetic stirring and nitrogen atmosphere. The water is heated to 80° C. and 10 g of styrene are added with stirring, followed by 100 mg acrylic acid dissolved in 10 mL DI water via syringe. 100 mg of ammonium persulfate is dissolved in 10 mL DI water and added to the stirred mixture via syringe. The reaction mixture is stirred for 24 hours at 80° C. The polymer colloid dispersion is allowed to cool to room temperature and is purified via centrifugation, producing polystyrene nanospheres having an average particle size of 250 nm.

The aqueous polystyrene colloid dispersion is diluted to 1 wt % with deionized water and 1 wt % silica nanoparticles are added and the mixture is sonicated to prevent particle agglomeration. The aqueous dispersion is spray-dried to provide polymer template microspheres comprising polymer nanospheres and silica. The microspheres are calcined by heating from room temperature to 500° C. over a 3 hour period, holding at 500° C. for 2 hours, and cooling back to room temperature over a 3 hour period. Provided are porous silica microspheres.

Example 5

Visible Color in a Bulk Sample

In these bulk color examples, 0.5 milligrams of porous microspheres are evenly placed in a 10 mL clear glass vial having a 6 cm² bottom surface. The color is observed with the human eye.

Two samples of porous silica microspheres are prepared in a similar fashion to Example 1, wherein the wt/wt ratio of polymer to silica is 1:1 and 3:1, respectively. The 1:1 wt/wt sample is white and the 3:1 wt/wt sample exhibits a distinct blue color.

A sample of porous silica microspheres is prepared according to Example 1, where the polystyrene nanospheres have an average particle size of 360 nm and the wt/wt ratio of polymer to silica is 3:1. The sample exhibits a distinct green color.

Porous silica microspheres are prepared in a similar fashion to Example 4, where the polystyrene nanospheres have an average particle size of 360 nm. With a wt/wt ratio of polymer to silica of 4:1, the porous microspheres have a porosity of 0.55 and exhibit a distinct green color. With a wt/wt ratio of polymer to silica is 2:1, the porous microspheres have a porosity of 0.45 and exhibit a distinct orange color.

Example 6

Zinc Oxide Porous Microspheres

A sample of porous zinc oxide microspheres is prepared according to the procedure of Example 4, replacing silica with zinc oxide and where the polystyrene nanospheres have an average particle size of 230 nm and a wt/wt ratio of polymer to zinc oxide of 1:2. A 0.5 mg sample of porous microspheres are evenly placed in a 10 mL clear glass vial having a 6 cm² bottom surface. The sample exhibits a distinct blue color to the human eye.

Example 7

Silica/Titania Porous Microspheres

A sample of porous microspheres containing silica and titania is prepared according to the process of Example 1, wherein the wt/wt ratio of polymer to total metal oxide is 3:1. The wt/wt ratio of silica to titania is 9:1.

The invention claimed is:

1. A method to prepare porous metal oxide microspheres, the method comprising:
   forming a liquid dispersion of polymer nanospheres and a metal oxide;
   forming liquid droplets of the dispersion;
   drying the liquid droplets to provide polymer template microspheres comprising the polymer nanospheres and the metal oxide; and
   removing the polymer nanospheres from the template microspheres to provide the porous metal oxide microspheres,
   wherein the microspheres have
   an average diameter of from about 0.5 μm to about 100 μm,
   an average porosity of from about 0.10 to about 0.80 and
   an average pore diameter of from about 50 nm to about 999 nm.

2. A method according to claim 1, comprising forming a liquid dispersion of polymer nanospheres and the metal oxide, spray-drying the liquid dispersion to provide polymer template microspheres and removing the polymer nanospheres from the template microspheres.

3. A method according to claim 1, comprising forming the liquid droplets with a vibrating nozzle.

4. A method according to claim 1, wherein the liquid droplets are aqueous droplets or oil droplets.

5. A method according to claim 1, comprising providing a continuous phase and mixing the liquid dispersion with the continuous phase to form an emulsion containing the liquid droplets and collecting the liquid droplets.

6. A method according to claim 5, comprising drying the liquid droplets to provide polymer template microspheres comprising polymer nanospheres and metal oxide and removing the polymer nanospheres from the template microspheres.

7. A method according to claim 6, wherein drying the liquid droplets comprises microwave irradiation, oven drying, drying under vacuum, drying in the presence of a desiccant, or a combination thereof.

8. A method according to claim 5, wherein the liquid droplets are formed in a microfluidic device.

9. A method according to claim 1, wherein a wt/wt ratio of polymer nanospheres to the metal oxide is from about 0.5/1 to about 10.0/1.

10. A method according to claim 1, wherein the polymer nanospheres have an average diameter of from about 50 nm to about 990 nm.

11. A method according to claim 1, wherein the polymer nanospheres are formed from a polymer selected from the group consisting of poly(meth)acrylic acid, poly(meth)acrylates, polystyrenes, polyacrylamides, polyethylene, polypropylene, polylactic acid, polyacrylonitrile, derivatives thereof, salts thereof, copolymers thereof and combinations thereof.

12. A method according to claim 1, wherein the metal oxide is selected from the group consisting of silica, titania, alumina, zirconia, ceria, iron oxides, zinc oxide, indium oxide, tin oxide, chromium oxide and combinations thereof.

13. A method according to claim 1, wherein the porous microspheres are monodisperse.

14. A method according to claim 1, wherein the porous metal oxide microspheres are a bulk sample of microspheres.

15. A method according to claim 1, wherein removing the polymer nanospheres from the template microspheres comprises calcination, pyrolysis or solvent removal.

16. A method according to claim 1, wherein removing the polymer nanospheres comprises calcining the template microspheres at temperatures of from about 350° C. to about 700° C. for a period of from about 1 hour to about 8 hours.

* * * * *